Figure 1:
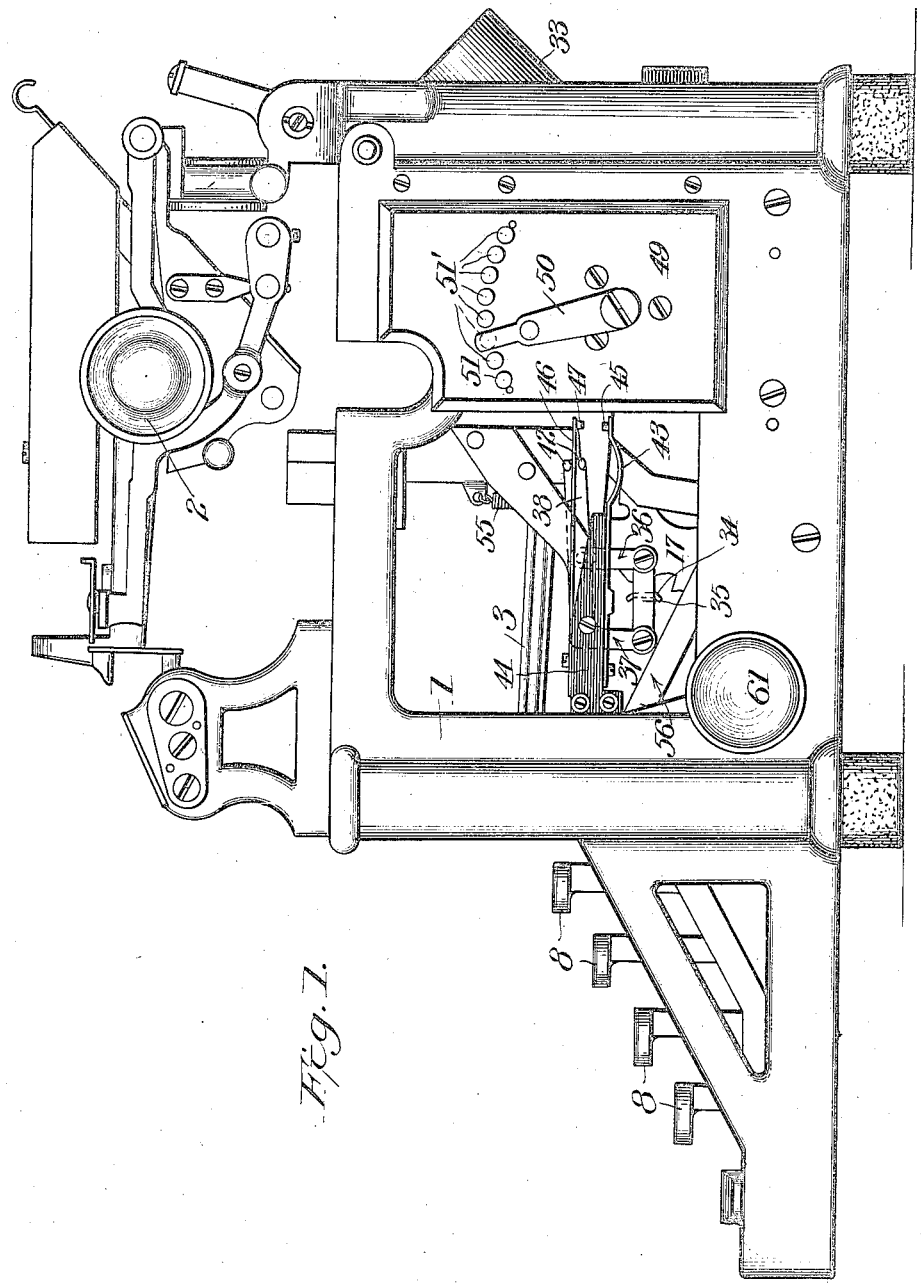

J. T. SCHAAFF.
TYPE WRITING AND OTHER KEY ACTUATED MACHINE.
APPLICATION FILED APR. 14, 1908.

1,075,944.

Patented Oct. 14, 1913.
7 SHEETS—SHEET 1.

Witnesses
C. N. Walker
Grace P. Brereton

Inventor
John T. Schaaff
By Sturtevant & Mason
Attorneys

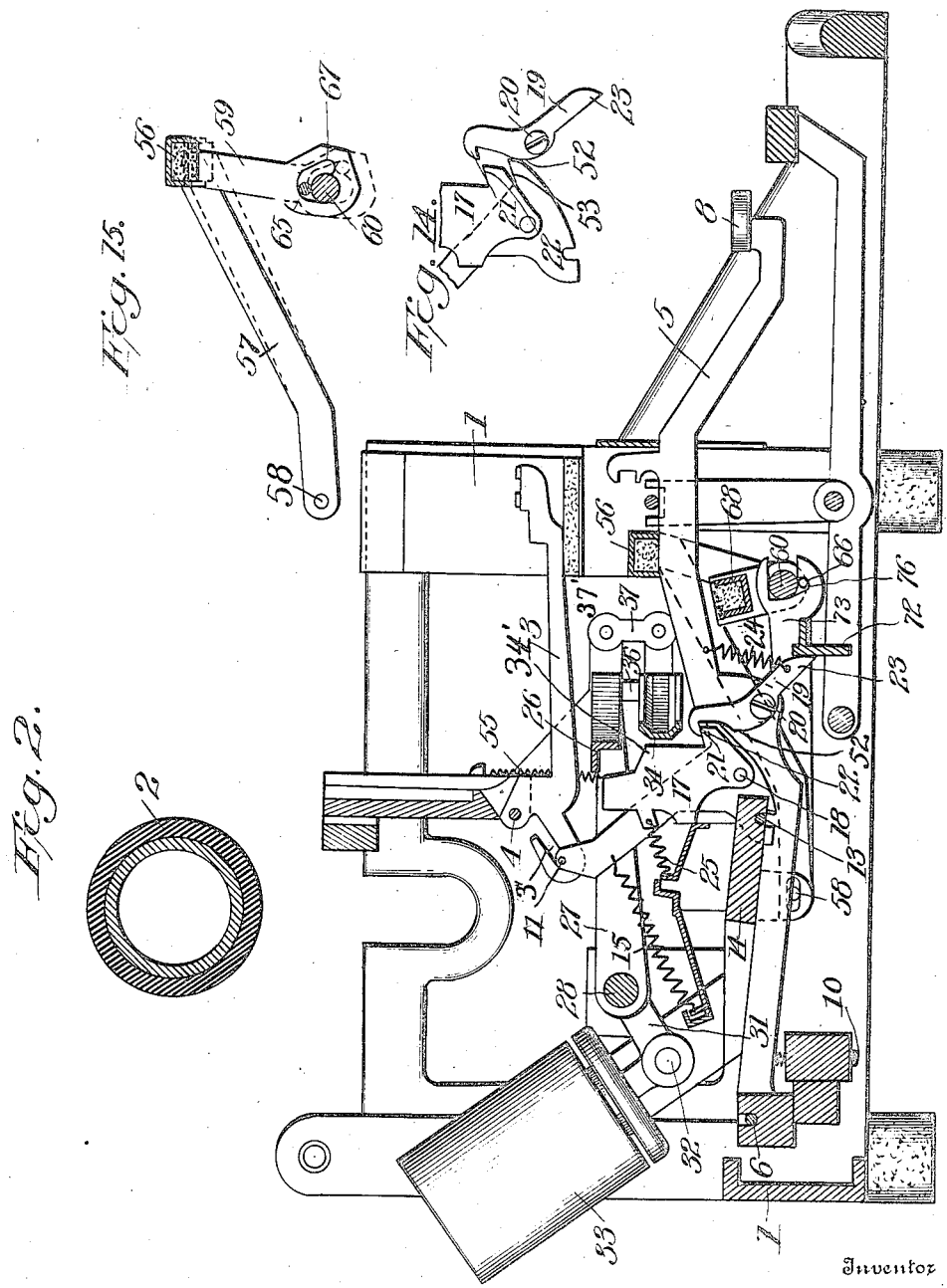

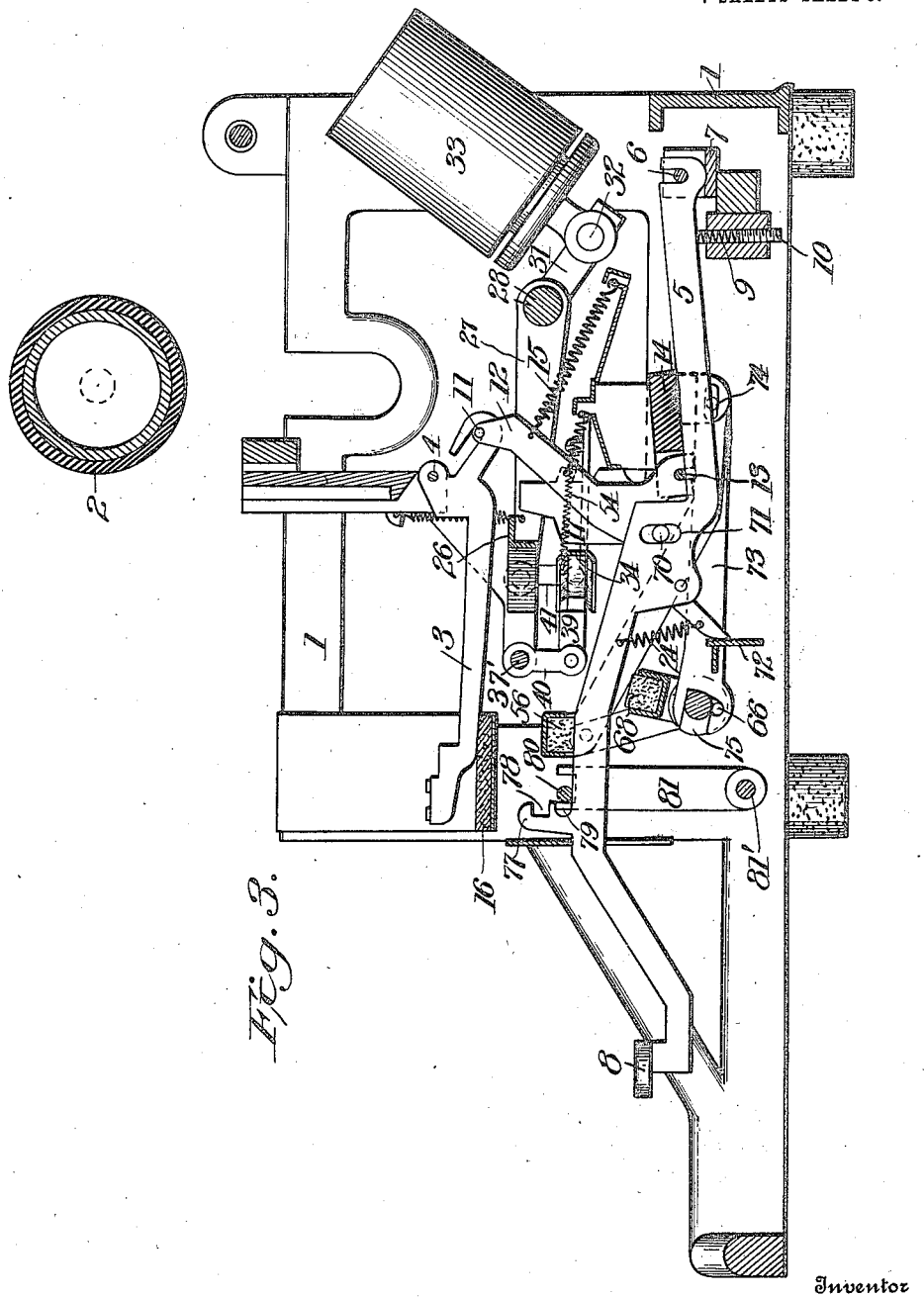

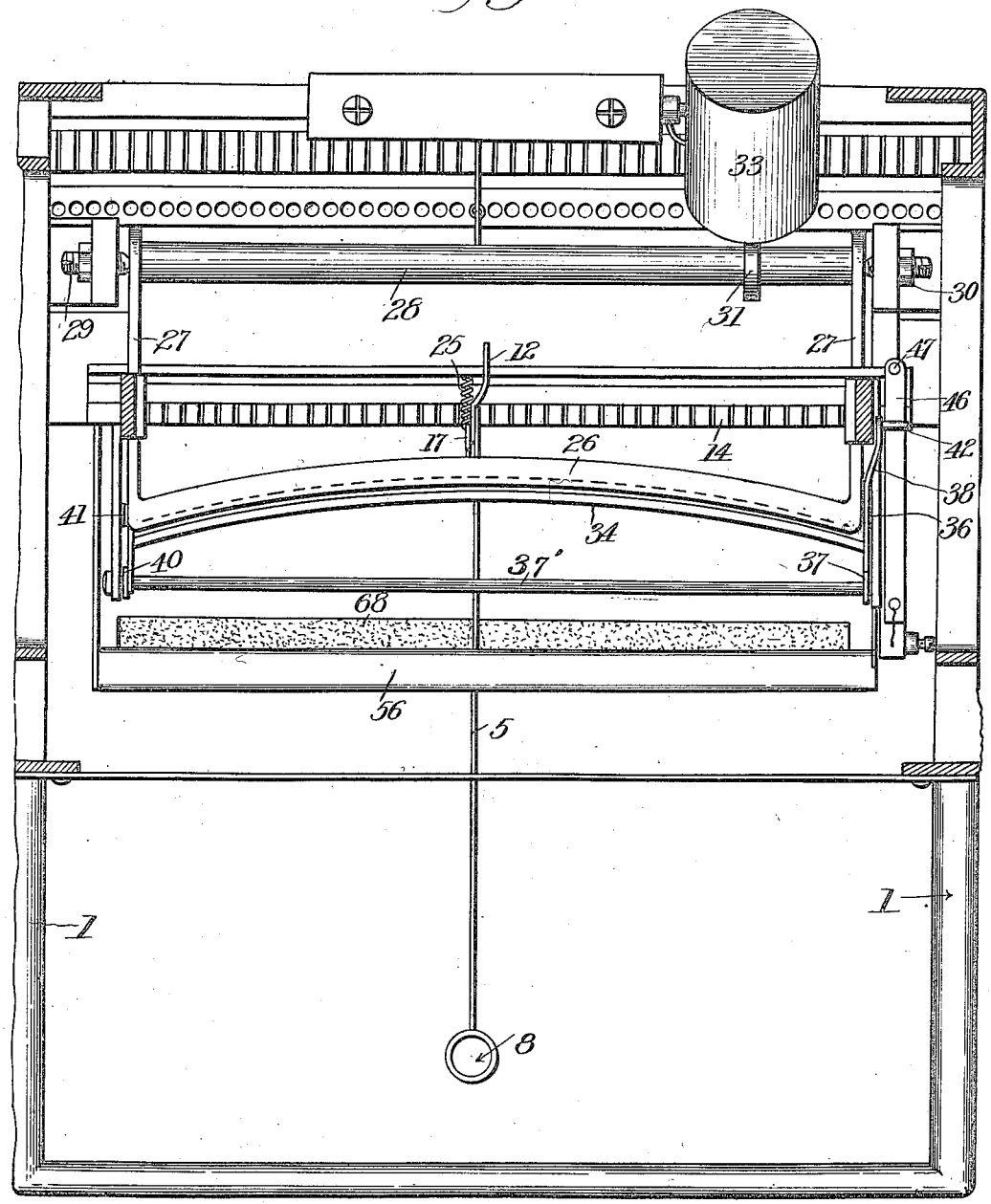

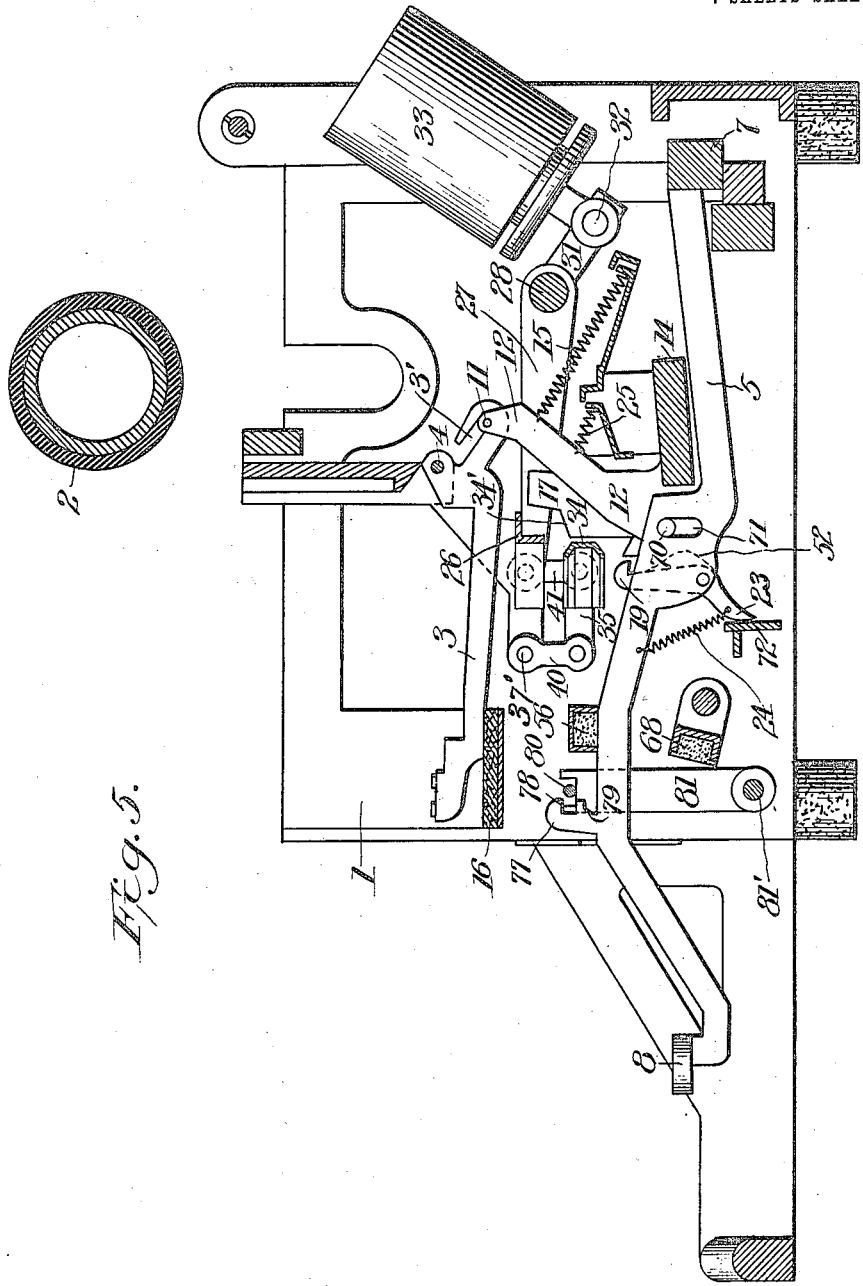

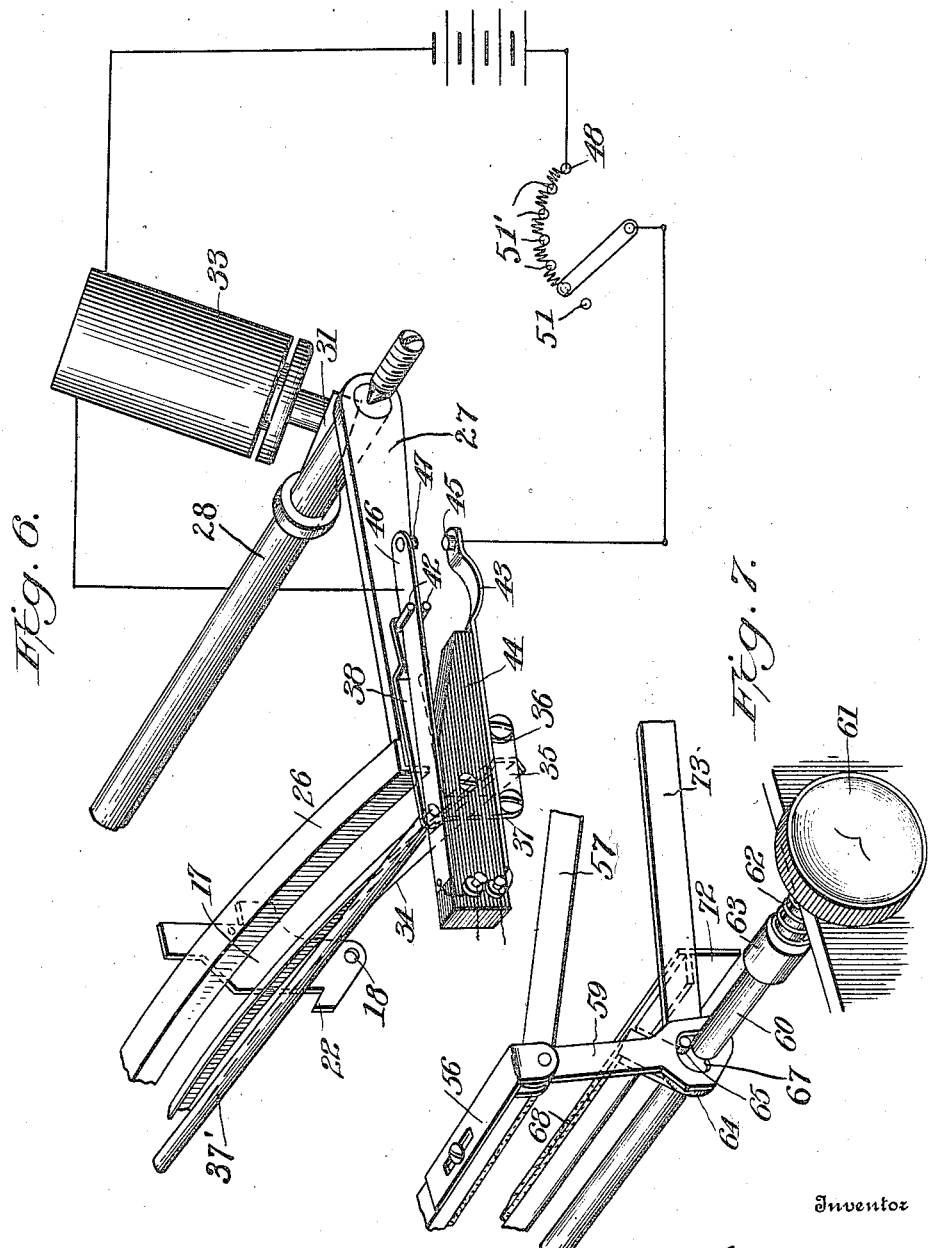

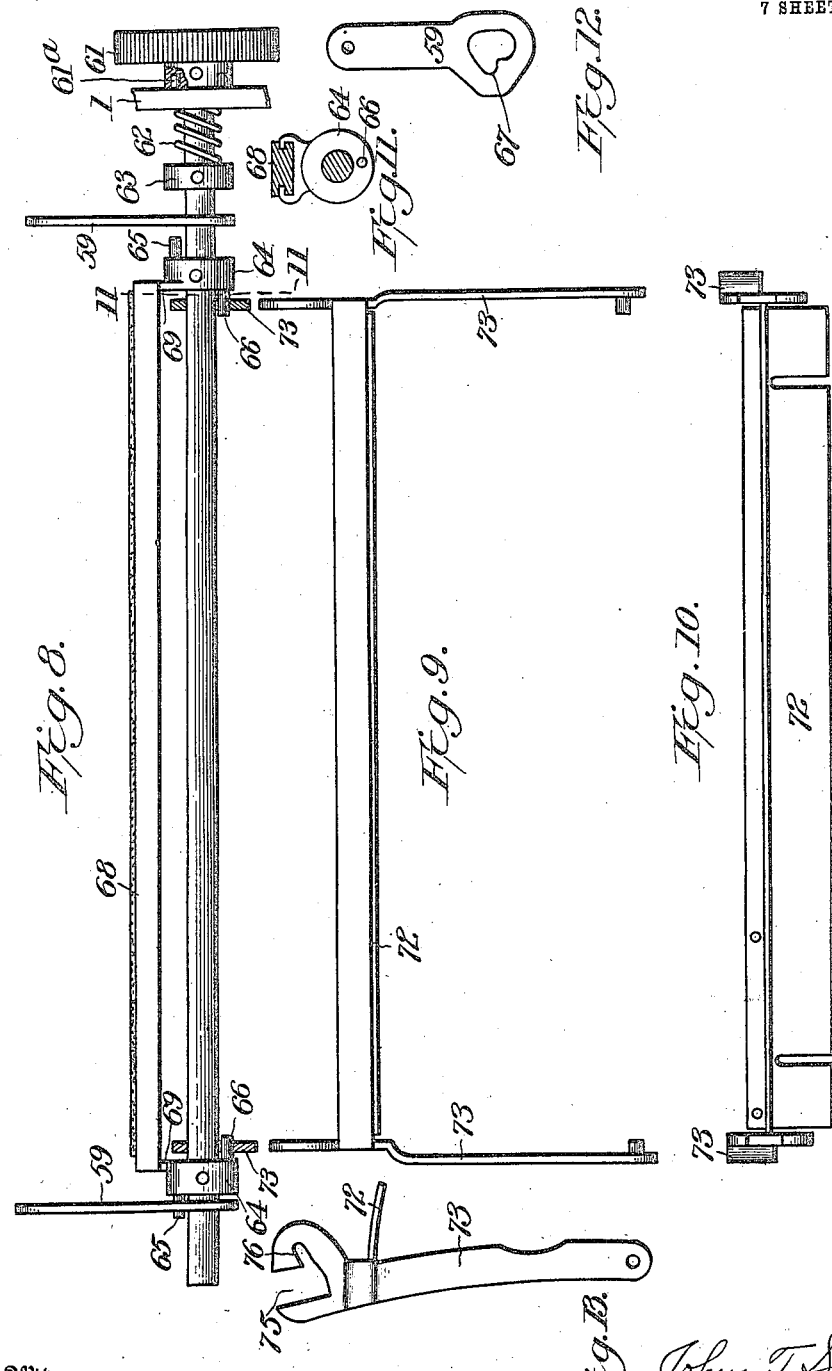

UNITED STATES PATENT OFFICE.

JOHN T. SCHAAFF, OF WASHINGTON, DISTRICT OF COLUMBIA.

TYPE-WRITING AND OTHER KEY-ACTUATED MACHINE.

1,075,944.  Specification of Letters Patent.  Patented Oct. 14, 1913.

Application filed April 14, 1908. Serial No. 427,013.

*To all whom it may concern:*

Be it known that I, JOHN T. SCHAAFF, a citizen of the United States, residing at Washington, in the District of Columbia, have invented certain new and useful Improvements in Type-Writing and other Key-Actuated Machines, of which the following is a description, reference being had to the accompanying drawing and to the letters and figures of reference marked thereon.

My invention relates to typewriting and other key-actuated machines, and particularly to that class of typewriting machines in which a pivoted type bar or other operated part is caused to strike against the front of the platen or other element on which the operated part is intended to act, so that the result of the blow of the type bar or other operated part will be visible to the person operating the keys.

My invention has for its object to provide a construction by which a typewriting or other key-controlled machine of the class above referred to, may be operated by power mechanism controlled or set in operation by the finger keys, and further to provide a construction by which such machines may be operated at will, either by power mechanism controlled by the keys, or directly by the depression of the keys by the hand of the operator.

My invention consists in the parts, improvements and arrangements hereinafter described, and particularly pointed out in the appended claims.

In the drawings which show by way of illustration one embodiment of my invention, Figure 1 is a side elevation of a typewriting machine having my invention applied thereto; Fig. 2 is a vertical section from front to rear, as seen from the left of the machine; Fig. 3 is a similar view, as seen from the right of the machine; Fig. 4 is a horizontal section showing the motor frame; Fig. 5 is a view similar to Fig. 3, with the parts shifted for manual operation; Fig. 6 is a detail perspective, showing the motor frame and the contact mechanism; Fig. 7 is a detail perspective, showing the felted stops for the key levers and the shifting mechanism therefor; Fig. 8 is a detail in side view of one of the felted stops and its support; Fig. 9 is a detail in plan of the plate for releasing the pawls; Fig. 10 is a side view of the same; Fig. 11 is a sectional view on the line 11—11 of Fig. 8; Fig. 12 is a view of one of the links for drawing the upper felted stop down to depress the whole bank of key levers when set to operate manually; Fig. 13 is a side view of the links 73 shown in Figs. 9 and 10; Fig. 14 is a detail showing the motor frame drawn down; and Fig. 15 is a detail showing the upper felted stop and the means for supporting and operating the same.

In the drawings, 1 is the frame of a front strike typewriting machine. The machine herein shown is of the well known Underwood type, having a platen 2, and type bars 3, pivoted at 4, and arranged when operated to strike upward against the front of the platen.

5 is the key lever pivoted at 6 to a bar 7, located toward the rear of the machine. Each key lever carries a finger piece 8. A spring 9 (see Fig. 3) preferably made adjustable by means of a screw 10, bears against the under side of the key lever and normally holds the same in a raised position. I have provided mechanism intermediate the key lever and the type bar whereby said type bar may be manually operated from said key lever, and other means whereby said type bar may be operated by power mechanism controlled by said key lever.

I will first describe my improved means for operating the type bar by power mechanism controlled by the key lever. Said type bar is provided with the usual rearwardly extending arm, which is slotted at 3′ to receive an operating pin 11 carried by the intermediate or auxiliary lever 12, which is pivoted at 13, to a bar 14 secured to the frame of the machine. A spring 15 is secured at one end to said intermediate or auxiliary lever 12, and at its other end to a plate secured to the framework of the machine. Said spring 15 normally holds the upper end of said auxiliary lever in its rearward position and the type bars 3 resting on a felted support 16. Said auxiliary lever carries a push finger 17, (see Fig. 2) which is pivoted by the rivet 18 to said auxiliary lever. A latch 19 is pivoted at 20 to the key lever 5, and is provided at its upper end with a projecting hook 21, which is adapted to engage a toe 22 extending forwardly from the push finger 17. Said latch 19 is provided with a tail piece 23, and a spring 24, is secured to said tail piece at one end and the key lever at the other end and normally holds said latch with its upper end thrown toward the rear of the machine and the hook 21 of said latch engaging over the projecting toe 22 of the push finger 17.

As a means for operating the type bar, I have provided a motor frame having a platform 26, which is carried by arms 27 rigidly secured to a bar 28 (see Fig. 4) pivoted in the sides of the frame toward its rear to adjustable pivot bolts 29 and 30. The connecting bar 28 carries an arm 31, which is pivoted at 32 to the operative part of a motor 33. Said motor, as herein shown, is an electric magnet, or solenoid, which is normally inactive. When the key lever 5 is depressed, the latch 19 will throw the push finger 17 forward, bringing the upper end thereof beneath the platform 26. Upon closing the circuit, the electric magnet will then operate to draw up the arm 31 and to throw down the motor frame platform 26, which in turn will move the push finger 17 downward, carrying with it the intermediate lever 12, to which it is pivoted at 18, and which in turn operates the type bar.

As a means for closing the circuit to cause the electric magnet to operate the motor frame, I have provided a contact bar 34. Said contact bar 34 is secured at one end to a cross bar 35, suspended by pivoted links at 36 and 37. The link 37 has formed integral therewith an arm 38, which projects toward the rear of the machine, and is substantially parallel with the cross bar 35. At the opposite side of the machine, the contact bar is rigidly secured to a cross bar 39, which is supported by pivoted links 40 and 41. The links 37 and 40 are rigidly secured to the rock shaft 37'. The contact bar 34 is located directly in front of the push fingers 17, (one finger for each key), so that when the key is depressed the latch oscillates said push finger upon its supporting pivot, throwing the same under the motor frame, the front edge 34' of said push finger striking the contact bar and swing the same upon its supporting links. Said contact bar being supported by two links at each end, moves forward and backward in substantially a right line. As said contact bar is moved backward and forward, the link 37 will cause the arm 38 formed integral therewith, to oscillate a distance depending upon the movement of the contact bar. Said arm 38 is provided at its rear end with two spaced fingers 42, 42.

A spring finger 43 is mounted upon a block 44 of suitable insulating material, and carries a contact point 45 at its rear end. A second spring finger 46 is secured to the upper side of said block 44, and carries a contact point 47 projecting downward from its rear end. Said spring finger 46 is located between the projecting fingers 42, 42, carried by the arm 38, so that as said arm 38 is oscillated, the contact points 45 and 47 will be brought together. A line is led from a suitable source of electrical supply to said motor, and from the motor to contact 47, and another line is led from said source of electrical supply through a rheostat 48 and thence to the contact member 45. It will, therefore, be seen that when the key lever is depressed, the push finger is thrown forward under the motor frame, and at the same time the contact bar is moved forward, causing a contact between the points 45 and 47, which will energize the motor and cause the motor frame platform to swing downward, and thus through the connections described operate the type bar. The rheostat may be of any form desired, but is herein shown as carried by a plate 49 and a lever 50 may be moved so as to contact with one of the pins 51' to throw in the desired amount of resistance, or with the dead pin 51 to break the circuit entirely.

In this type of machine, the push pieces 17, are preferably set in a line forming the arc of a circle. The motor frames and contact are consequently curved to conform to the line of the push pieces. In view of the fact that the contact bar moves in substantially a right line back and forth, it may be curved as above noted.

It is very desirable in this type of machine, that the parts should return to the normal inactive position as soon as the impression is made by the type bar or other working part, irrespective of whether the operator has released the key lever or not. In order to accomplish the release for permitting such return, I have provided the pivoted latch 19 with a cam face 52, and I have provided the intermediate lever 12 with a forwardly projecting toe 53, which engages the cam 52, of the latch, when said intermediate lever is depressed by the motor frame throwing the latch backward or toward the front of the machine, and out of engagement with and out of the path of the toe 22 on the push finger 17. As the push piece 17 is forced down by the motor-frame, the shoulder 34' passes below the plane of movement of the contact frame 34, and said frame is free to return to its position of rest toward the rear of the machine, thus breaking the circuit and allowing all operated parts to resume their positions of inactivity before the finger key is released. As soon as the latch is released, the push finger 17 will be retracted by the spring 25, the contact bar 34 having swung toward the rear of the machine through the influence of the spring 54, which breaks the circuit and allows the motor frame platform 26 to be drawn upward through the influence of the spring 55, and this in turn allows the type bar to resume its normal position on the felted support 16. It will thus be seen that I have provided power mechanism for operating a type bar, which is controlled by the key lever. The key lever only requires a very slight movement, in order to move the parts sufficiently to bring about the operation of the motor. It has been found in actual practice, that a movement of a quarter of an inch or even less, of the finger piece is sufficient to accomplish the desired result. Of course, it will be understood that each type bar is provided with an intermediate lever and a push piece and a latch for operating the same, but I employ but one motor and one motor frame and one contact frame, which are common to all the type bars.

As a means for limiting the upward movement of the key lever 5, I have provided a felted stop 56, which is carried by arms 57, pivoted at 58 to the frame of the machine. Links 59 are also attached to said stop 56, and at their lower end are provided with an opening which surrounds a shaft 60 mounted in suitable bearings in the frame of the machine. Said shaft 60 is provided with a suitable thumb piece 61, whereby the same may be rotated by the hand of the operator when desired. A spring 62 bearing against the frame of the machine and a collar 63 on the shaft 60, normally forces said shaft longitudinally toward the left so as to hold the thumb piece 61 in contact with the frame of the machine. Said thumb piece 61 is provided with an opening adapted to engage a pin 61$^a$ on the frame of the machine, so that when desired, said shaft may be moved longitudinally toward the right releasing the opening from the pin in the frame, and given a partial rotation, after which it may be released in order that the said pin may enter another opening in the thumb piece, see Fig. 8. It will thus be seen that the said shaft may be rotated from one position to another, and firmly locked in either of said positions. Said shaft 60 is provided with disks or collars 64, one at each end each of which is rigidly secured thereto and carries outwardly projecting pins 65 and inwardly projecting pins 66. The link 59 which supports the felted stop 56, is provided with a cam slot 67, which receives one of the pins 65 carried by the collar 64. As said shaft 60 is rotated, the pin 65 will be carried around in the link 59 until said pin engages the end of said cam slot 67, after which the link 59 will be drawn down, carrying with it the felted stop 56. On the other hand, when the shaft 60 is rotated in the opposite direction, said pin 65 will raise the felted stop 56, through the links 59. A second felted stop 68 is located underneath the key levers 5, and when the machine is adapted to be operated by power mechanism controlled by the key levers, said felted stop is in the position shown in Figs. 2 and 3, that is, directly underneath the key levers, but spaced a sufficient distance therefrom as to allow a limited movement of said key levers, which movement, of course, must be sufficient to cause the push finger 17 to be properly positioned relative to the motor frame and the contact bar to be thrown sufficiently to cause a contact between the contact points 45 and 47. Said felted stop 68 is carried by arms 69, 69, (Fig. 8) rigidly carried by the collars 64, 64, which are secured to the shaft 60. When the shaft 60 is rotated, the felted stop 68 will be moved to the position shown in Fig. 5. The moving of said felted stop 68 to the position shown in Fig. 5, turns said stop down from the key lever, so that said key lever may have a wider range of movement.

I will now describe the mechanism for manually operating the type bar. The pivot rivet 18 which secures the push piece 17 to the horizontal arm of the intermediate lever 12, has an extension head or pin 70, which enters the slot 71 formed in the key lever 5. Said slot is so disposed in said key lever that when said key lever is in the position shown in Figs. 2 and 3, the pin 70 is out of contact with the ends of said slot. The limited movement of the key lever 5 when the machine is being operated by power mechanism, is not sufficient to bring the upper end of the slot 71 into contact with the pin 70. When, however, it is desired to operate the machine manually, the shaft 60 is rotated by means of the thumb piece 61, which will cause the felted stop 56 to be drawn down. Inasmuch as said felted stop limits the upward movement of the key lever when said stop is lowered, the extreme upward position of the key lever is also lowered. The downward movement of the stop 56 when the machine is shifted so as to be operated manually, is sufficient to bring the upper end of the slot 71 into contact with the pin 70 on the intermediate lever 12.

As above noted, the lower felted stop is moved away from the key levers 5, so that said key levers may be depressed a greater distance. It will now be seen that the key levers 5 are directly connected to the auxiliary levers 12 through the slots 71 and pins 70, and that when a key lever is depressed by the operator, its auxiliary lever 12 will be swung about its pivot operating the type bar. The only means for limiting the downward movement of the key levers, is the striking of the type against the platen. In order to throw the latches 19 for the various keys to inoperative position, so that when the key lever is depressed its push finger will not be thrown forward under the motor frame or against the contact frame, I have provided the following means: A throwing out plate 72 is located adjacent the tail 23, of each of the latches 19, and when said throwing out plate 72 is moved from the position shown in Figs. 2 and 3 to the position shown in Fig. 5, it will be seen that the latches are thrown so as to move the upper end thereof toward the front of the machine, and to such a position that when the key lever is depressed, said latch will not engage the push finger 17. The throwing out plate 72 is carried by sliding bars 73, (Fig. 3), which are slotted at one end, so as to engage a pin 74 mounted in the frame of the machine and provided with open guide slots 75 at their other end to engage the shaft 60, and the operating pins 66. Said bars 73, as shown more clearly in Fig. 13, are provided with cam slots 76, leading from the slot 75. Said bars are so located that the pin 66 carried by the collar 64 will engage the cam slots 76, thus sliding the bar 73 longitudinally one way or the other, as the shaft 60 is rotated. It will be apparent, therefore, that upon the turning of the thumb piece 61 in one direction, the lower felted stop 68 will be moved from beneath the key lever, the upper felted stop 56 will be drawn down, which in turn will depress all of the key levers so as to bring the pins 70 into contact with the upper ends of the slots 71; and the throwing out plate 72 will be moved toward the rear of the machine, which will engage all the latches 19, throwing the same to inoperative position. The type bars may now be operated by depressing the key levers 5. I have provided each of the key levers with an integrally formed lugs 77, which is provided with two notches 78 and 79. The line locking rod 80 is suitably mounted as in ordinary use in the Underwood typewriters just above the key levers 5 and spaced by clearance only toward the rear from lugs 77, and is operated in the manner usual with this type of machine by arms 81, carried on a shaft 81'.

When the machine is adjusted to be operated by power mechanism, the locking rod 80 coöperates with the notch 79 in the lug 77. When the machine is adjusted for manual operation, the locking rod 80 coöperates with the notch 78 in the lug 77. The carriage and the means for shifting the same and the various other parts of the machine have not been described, as they are of the usual Underwood construction, and a description of them is unnecessary to a clear understanding of my present invention.

In the operation of my device, the key lever 5 is depressed which depresses the latch 19. As the hook 21 stands normally over the toe 22, said hook will immediately engage the toe and turn the push piece 17 about its pivotal support, and bring the upper end thereof under the motor frame platform 26. At the same time the contact bar 34 will be engaged by the shoulder 34' of the push piece 17 thus bringing the contact points 45 and 47 together. The key lever 5 then contacts with the felted stop 68 and prevents further depression of the key. It will be noted that the operator moves only the push piece 17 and does not actuate the intermediate lever 12. The instant the push piece 17 has been thrown forward by the slight depression of the finger key 5, the contact points 45 and 47 having been brought together, the motor is energized and causes the motor frame platform 26 to move down, forcing the push piece 17 downward and carrying with it the horizontal arm of the intermediate lever 12 to which it is pivoted. This of course, throws the vertical arm of the intermediate lever 12 forward and operates the typebar. As the push piece in its forward position, is being forced down by the motor frame platform, when it has moved a relatively short distance, the shoulder 34' passes below the plane of movement of the contact bar 34, and the latter is left free to return to its position of rest, thus breaking the circuit, and deënergizing the motor 33. As the toe 22 of the intermediate lever 12 is forced down by the push piece 17 it engages the cam face 52 of the latch 19 and disengages the hook 21 of said latch from the toe 22, when the push piece 17 is drawn by its spring 25 into its rearward position, and all the operated parts (except the key lever) are free to return to their normal inactive position in advance of the release of the key. When the machine is set to operate manually, the converter shaft 60 is moved a quarter turn by the thumb wheel 61 which as already described draws down the upper felted stop 56, and therethrough the whole set of key levers 5, turns the lower stop 68 down allowing the keys a deeper dip or depression, forces the latch-disengaging plate toward the rear and disengages all of the latches from the toes 22, and brings the ends of the slots 71 into engagement with the elongated heads 70 of the pivot rivets 18. All this is accomplished by the quarter turn of the converter shaft 60. With the machine thus set for manual operation, its manipulation is the same as though no electric features had been embodied.

Having described the machine electrically operated, I will now describe its operation non-electrically. When the finger key 5 is depressed, the end of the slot 71 takes against the pivot pin 70, which is carried by the horizontal arm of the intermediate lever 12. This lever 12 is rocked on its pivot 13, and through the engagement of the pin 11 with the slot 3', moves the typebar 3 to the printing point. When the operator releases the depressed key it is restored to its elevated position by its spring 9, while the lever 12 and typebar 3 are restored to their normal inactive position by the spring 15.

I do not herein claim broadly a typewriting or other key-actuated machine which may be operated by power mechanism controlled by key levers or by the key levers directly, as the broad invention is claimed in my copending application filed September 20th, 1904, Serial No. 225,263. The mechanism herein disclosed and claimed is not limited necessarily to this type of typewriting machine, nor in fact, to any typewriting machine, as it may be used with other machines such as linotype machines, matrix machines and other machines in which operating parts are actuated by or through the movement of a finger key.

It will be obvious that changes in the form and arrangement of the parts may be made, without departing from the spirit of my invention.

Having thus described my invention, what I claim as new and desire to secure by Letters Patent, is:—

1. In a key-controlled mechanism, the combination of a key lever, an operated part, a normally inactive motor, means including a push finger controlled by the key lever for causing the motor to be actuated, means including said push finger movable independently of the movement of the key lever and operated by the motor for actuating the operated part, and means independent of said first named means for actuating the operated part directly by the key lever.

2. In a key-controlled mechanism, the combination of a key lever, a type bar, a normally inactive motor, means including a push finger controlled by the key lever for causing the motor to be actuated, means including said push finger movable independently of the movement of the key lever operated by the motor for actuating the type bar, and means independent of said first named means for actuating the type bar directly by the key lever.

3. In a key-controlled mechanism, the combination of the key lever, an operated part, a normally inactive motor, means including a push finger controlled by the key lever for causing the motor to be actuated, means actuated by said motor for moving said operated part, said last named means including said push finger and an auxiliary lever, and means independent of said first-named means for directly connecting said auxiliary lever to said key lever.

4. In a key-controlled mechanism, the combination of the key lever, a type bar, a normally inactive motor, means including a push finger controlled by the key lever for causing the motor to be actuated, means including said push finger actuated by said motor for moving said type bar, said last named means including an auxiliary lever, and means independent of said first-named means for directly connecting said auxiliary lever to said key lever.

5. In a key-controlled mechanism, the combination of the key lever, an operated part, a normally inactive motor, means including a push finger controlled by the key lever for causing the motor to be actuated, means actuated by said motor for moving said operated part, including said push finger and an auxiliary lever, direct connecting means between said auxiliary lever and said key lever, said direct connection being independent of the first-named means and rendered effective or ineffective by the shifting of the key lever.

6. In a key-controlled mechanism, the combination of the key lever, a type bar, a normally inactive motor, means including a push finger controlled by the key lever for causing the motor to be actuated, means actuated by said motor for moving said type bar, including said push finger and an auxiliary lever, direct connecting means between said auxiliary lever and said key lever, said direct connecting means being independent of the first-named means and rendered effective or ineffective by the shifting of the key lever.

7. In a key-controlled mechanism, the combination of a key lever, means for shifting the normal position of said key lever, an operated part, a normally inactive motor, means controlled by the key lever for causing the motor to be actuated, means operated by said motor for moving said operated part, including an auxiliary lever, a pin carried by said auxiliary lever and engaging a slot in said key lever, said pin being so disposed relative to said slot, that the shifting of said key lever will bring said pin against the end of said slot.

8. In a key-controlled mechanism, the combination of a key lever, a type bar, a normally inactive motor, means controlled by the key lever for causing the motor to be actuated, means operated by said motor for moving said type bar, including an auxiliary lever, a pin carried by said auxiliary lever and engaging a slot in said key lever, said pin being so disposed relative to said slot, that the shifting of said key lever will bring said pin against the end of said slot.

9. In a key-controlled mechanism, the combination of a key lever, a type bar, a normally inactive motor, means controlled by the key lever for causing the motor to be actuated, means controlled by the key lever for rendering the movements of the motor effective or ineffective to operate the type bar, and means independent thereof for directly operating said type bar from said key lever.

10. In a key-controlled mechanism, the combination of a key lever, a type bar, a normally inactive motor, a motor frame operated thereby, an auxiliary lever connected to said type bar, common means including a push finger for rendering the movements of the motor frame effective or ineffective to operate the type bar through the auxiliary lever and to cause the motor to be actuated, said common means being controlled by the key lever, and means independent of said common means for directly connecting the type bar to the key lever through the auxiliary lever, whereby a movement of the key lever will through the auxiliary lever impart motion to the type bar.

11. In a key-controlled mechanism, the combination of a key lever, a type bar, a normally inactive motor, a motor frame operated thereby, an auxiliary lever connected to said type bar, common means including a push finger and a contact frame for rendering the movements of the motor frame effective or ineffective to operate the type bar and to cause the motor to be actuated, a latch carried by said key lever and operating said common means, and means independent of said latch for directly operating the type bar from said key lever.

12. In a key-controlled mechanism, the combination of a key lever, a type bar, a normally inactive motor, a motor frame operated thereby, means for causing the motor to be actuated and causing the motor frame to operate the type bar, said means including a pivoted latch, and means independent of said latch for directly operating said type bar from said key lever.

13. In a key-controlled mechanism, the combination of a key lever, a type bar, a normally inactive motor, a motor frame operated thereby, means for causing the motor to be actuated and causing the motor frame to operate the type bar, said means including a pivoted latch, means independent of said latch for directly operating said type bar from said key lever, and means for moving said latch to inoperative position when said type bar is operated directly by the key lever.

14. In a key-controlled mechanism, the combination of a key lever, a type bar, a normally inactive motor, a motor frame operated thereby, means operated by said motor frame for operating said type bar, said means including an auxiliary lever and a push finger carried by said auxiliary lever, means carried by said key lever for operating said push finger, and means independent thereof for directly connecting said auxiliary lever to said key lever.

15. In a key-controlled mechanism, the combination of a key lever, a type bar, a normally inactive motor, a motor frame operated thereby, means operated by said motor frame for operating said type bar, said means including an auxiliary lever and a push finger carried by said auxiliary lever, a pivoted latch carried by said key lever and engaging said push finger, a pin carried by said auxiliary lever and engaging a slot in said key lever, means for simultaneously moving said latch to inoperative position and causing said pin to contact with one end of said slot.

16. In a key-controlled mechanism, the combination of a key lever, a type bar, an auxiliary lever connected to said type bar, a push finger pivoted to said auxiliary lever, a motor frame coöperating with said push finger, a latch pivoted to said key lever and adapted to engage said push finger, a pin carried by said auxiliary lever and engaging a slot in said key lever, a stop for limiting the upward movement of said key lever, and means for shifting said stop, so as to depress said key lever, whereby said pin is brought into contact with one end of said slot.

17. In a key-controlled mechanism, the combination of a key lever, a type bar, an auxiliary lever connected to said type bar, a push finger pivoted to said auxiliary lever, a motor frame coöperating with said push finger, a latch pivoted to said key lever and adapted to engage said push finger, a pin carried by said auxiliary lever and engaging a slot in said key lever, a stop for limiting the upward movement of said key lever, and common means for moving said stop so as to shift said key lever and bring said pin into contact with the end of said slot and for moving said latch so as to render the same inoperative.

18. In a key-controlled mechanism, the combination of a key lever, a type bar, a normally inactive motor, a motor frame adapted to be operated thereby, means including a push finger for operating said type bar from said motor frame, and means for causing the motor to be actuated, including said push finger, a contact bar, contact points operated by said contact bar and parallel links for supporting said contact bar, whereby the latter moves forward and backward in substantially a right line.

19. In a key-controlled mechanism, the combination of a key lever, a type bar, a normally inactive motor, a motor frame adapted to be operated thereby, means including a push finger for operating said type bar from said motor frame, and means for causing the motor to be actuated, including said push finger, a contact bar, parallel links for supporting said contact bar whereby the latter moves forward and backward in substantially a right line, one of said links having an arm rigid therewith, and a contact point operated thereby.

20. In a key controlled mechanism, the combination of a key lever, a type bar, a normally inactive motor, a motor frame adapted to be operated thereby, means controlled by the key lever for causing the motor frame to be actuated including a curved contact bar, parallel links for supporting said contact bar, and contact points operated by said contact bar.

21. In a key-controlled mechanism, the combination of a key lever, a type bar, a normally inactive motor, means controlled by the key lever for causing the motor to be actuated, including a curved contact bar, parallel links for supporting the same, and means operated by said motor for moving the type bar, said means including an auxiliary lever, a push finger carried thereby and means operated by the key lever for moving said push finger.

22. In a key-controlled mechanism, the combination of a key lever, a type bar, a normally inactive motor, a curved motor frame operated thereby, means controlled by the key lever for causing the motor to be actuated, including a contact bar curved to correspond to the motor frame, means for supporting said contact bar, and means operated by said motor frame for moving said type bar.

23. In a key-controlled mechanism, the combination of a key lever, a type bar, a normally inactive motor, a curved motor frame operated thereby, means controlled by the key lever for causing the motor to be actuated, including a contact bar curved to correspond to the motor frame, means for supporting said contact bar, means operated by said motor frame for moving said type bar, and means for actuating the type bar directly from the key lever.

24. A key-controlled mechanism, including in combination, a key lever, a type bar, a normally inactive motor, a motor frame operated thereby, comprising a bar, arms for supporting said bar, and adjustable pivot screws for supporting said motor frame, means intermediate said motor frame and said type bar for moving the same, and means operated by the key lever for causing the motor to be actuated.

25. A key-controlled mechanism, including in combination, a key lever, a type bar, a normally inactive motor, a motor frame operated thereby, comprising a bar, arms for supporting said bar, and adjustable pivot screws for supporting said motor frame, means intermediate said motor frame and said type bar for moving the same, means operated by the key lever for causing the motor to be actuated, and means for actuating the type bar directly by the key lever.

26. In a key-controlled mechanism, the combination of a plurality of key levers, a plurality of type bars, a normally inactive motor, a motor frame common to each one of said key levers, means intermediate said motor frame and each of said type bars for operating said type bars, and means for controlling said motor, means for causing the motor to be actuated from any one of said key levers, including a latch carried by each of said levers, and a releasing plate for simultaneously moving each of said latches to inoperative position, and means for actuating each of the type bars directly from their respective key levers.

27. In a key-controlled mechanism, the combination of a key lever, a spring for lifting said key lever, a felted stop for limiting the upward movement of said key lever, a type bar, a motor, means controlled by said key lever for causing said motor to be operated, means for causing said motor to operate said type bar, a stop beneath said key lever, whereby the same is permitted to have a limited movement, means for directly operating said type bar from said key lever, and common means for moving the stop from beneath the key lever and for depressing the stop above the key lever, so as to shift said key lever and bring about the connection between the type bar and the key lever.

28. In a key-controlled mechanism, the combination of a key lever, a felted stop above said key lever, a felted stop beneath said key lever, a shaft for moving the stop from beneath said key lever and depressing the stop above said key lever, and means for locking said shaft in predetermined positions.

29. In a key-controlled mechanism, the combination of a key lever, a felted stop above said key lever, a felted stop beneath said key lever, a shaft for moving the stop from beneath said key lever and depressing the stop above said key lever, a thumb piece for operating said shaft, a spring for moving said shaft in one direction, and locking stops for holding said shaft in predetermined positions.

30. In a key-controlled mechanism, the combination of a key lever, a felted stop above said key lever, a felted stop beneath said key lever, a shaft for moving the stop from beneath said key lever and depressing the stop above said key lever, a thumb piece for oscillating said shaft, a spring for moving said shaft longitudinally, a pin carried by said thumb piece and registering with an opening in the frame of the machine, whereby the said shaft is locked in predetermined positions.

31. In a key-controlled mechanism, the combination of a key lever, a stop for limiting the upward movement of said key lever, pivoted arms connected to said stop, a shaft, links connecting said stop to said shaft, and means for oscillating said shaft and depressing said stop.

32. In a key-controlled mechanism, the combination of a key lever, a stop for limiting the upward movement of said key lever, pivoted arms connected to said stop, a shaft, links connecting said stop to said shaft, said links having a cam slot and a pin eccentrically carried by said shaft and engaging said slot for shifting said stop.

33. In a key-controlled mechanism, the combination of a key-lever, a stop for limiting the upward movement of said key lever, a stop for limiting the downward movement of said key lever, a shaft, an arm rigidly carried by said shaft and connected to said lower stop, pivoted arms connected to said upper stop, links connected to said upper stop and connected to said shaft, said links having cam slots therein, and pins carried by said shaft coöperating with said slots for depressing said stop.

34. In a key-controlled mechanism, the combination of a key lever, a type bar, a motor, means operated by said motor for moving said type bar, means for controlling the actuation of said motor from said key lever, including a pivoted latch, a releasing plate for said latch, sliding arms carried by the frame of the machine and supporting said releasing plate, a shaft having means for moving said arms longitudinally.

35. In a key-controlled mechanism, the combination of a key lever, a type bar, a motor, means operated by said motor for moving said type bar, means for controlling the actuation of said motor from said key lever, including a pivoted latch, a releasing plate for said latch, sliding arms carried by the frame of the machine and supporting said releasing plate, a shaft, a collar carried thereby, a pin carried by said collar, said arms having a notch to receive said pin, whereby when said shaft is oscillated, said releasing plate will be moved thereby.

36. In a key-controlled mechanism, the combination of a key lever, a type bar, means for operating said type bar by power mechanism controlled by said key lever, means for operating said type bar directly from said key lever, means for shifting the operative position of the key lever when the machine is shifted from the power-actuated mechanism to the manually-actuated mechanism, a line lock including a bar, an arm carried by said key lever and having a plurality of notches, so as to coöperate with said line-locking bar in either position of said key lever.

37. In a key-controlled mechanism, the combination of a key lever, a type bar, means for operating said type bar by power mechanism controlled by said key lever, means for operating said type bar directly from said key lever, means for shifting the operative position of the key lever when the machine is shifted from the power-actuated mechanism to the manually-actuated mechanism, a line lock including a bar, an arm formed integral with the key lever and having a plurality of notches, so as to coöperate with said line-locking bar in either position of said key lever.

38. In a key controlled mechanism, the combination of a key lever, a type bar, an auxiliary lever directly connected to the type bar, a motor frame, means intermediate the motor frame and the auxiliary lever for actuating said auxiliary lever, a contact bar for controlling the motor frame, and a latch pivoted on the key lever and adapted to operate said contact bar.

39. In a convertible typewriter, the combination of a key lever and an operated part, an intermediate lever adapted adjacent one of its ends to engage the key lever and receive motion therefrom, and adapted adjacent its other end to engage the operated part and impart motion thereto upon a movement of the key lever, whereby said operated part may be actuated directly from the key lever, and key controlled means movable independently of the movement of the key lever for actuating through the intermediate lever said operated part from its normal position of rest upon a depression of the key lever.

40. In a convertible typewriter, the combination of a key lever, and an operated part, an intermediate lever having a stationary pivot intermediate its ends, said pivot being supported by the main frame of the machine, means for connecting said intermediate lever adjacent one of its ends directly to the key lever, and means for connecting said intermediate lever adjacent its other end directly to the operated part, whereby said operated part may receive motion from the key lever upon a movement of the key lever, and a key lever controlled means movable independent of the movement of the key lever, for actuating through the intermediate lever said operated part from its normal position of rest upon a depression of the key lever, and means for shifting said key lever to break the direct connection between the same and the intermediate lever, whereby said key lever may be moved independently of the intermediate lever to actuate said controlling means.

41. In a key controlled mechanism, the combination of an operated part, an auxiliary lever connected to said operated part, a normally inactive motor device and a motor frame adapted to be operated thereby, a motor controlling device, a key lever, a hooked lever pivoted to said key lever, a push finger adapted to receive motion from the key lever through the hooked lever and to transmit motion thus received to the motor controlling device, and to receive and transmit motion from the motor frame through the auxiliary lever to the operated part, and to permit said motor controlling device to again resume its normal position, and to free itself from its key connection and to resume its normal position, all upon a single depression of the key lever and while the key lever remains depressed; and means independent of said push finger and of said hooked lever for directly connecting the key lever to the auxiliary lever.

42. In a convertible typewriter, the combination of a printing device, an auxiliary lever connected to said printing device, an electromagnetic motor device included in a normally open circuit, a motor frame adapted to be actuated by said motor device, a circuit controlling device, a key lever, a hooked lever pivoted to said key lever, a push finger adapted to receive motion from the key lever through the hooked lever and to transmit motion thus received to the circuit controlling device, and to receive and transmit motion from the motor frame through the auxiliary lever to the printing device, and to permit said circuit controlling device to again resume its normal position, and to free itself from its key connection and to resume its normal position, all upon a single depression of the key lever and while the key lever may remain depressed; and means independent of said push finger and of said hooked lever for directly connecting the key lever to the auxiliary lever.

In testimony whereof I affix my signature, in presence of two witnesses.

JOHN T. SCHAAFF.

Witnesses:
 H. P. HOWARD, Jr.,
 GRACE P. BRERETON.